(12) United States Patent
Amano

(10) Patent No.: US 11,618,495 B2
(45) Date of Patent: Apr. 4, 2023

(54) STEERING DEVICE

(71) Applicant: JTEKT CORPORATION, Osaka (JP)

(72) Inventor: Akifumi Amano, Kashihara (JP)

(73) Assignee: JTEKT CORPORATION, Osaka (JP)

( * ) Notice: Subject to any disclaimer, the term of this patent is extended or adjusted under 35 U.S.C. 154(b) by 164 days.

(21) Appl. No.: 17/130,709

(22) Filed: Dec. 22, 2020

(65) Prior Publication Data

US 2021/0197885 A1 Jul. 1, 2021

(30) Foreign Application Priority Data

Dec. 25, 2019 (JP) .............................. JP2019-234609

(51) Int. Cl.
*B62D 3/12* (2006.01)
*B62D 5/04* (2006.01)

(52) U.S. Cl.
CPC ........... *B62D 3/126* (2013.01); *B62D 5/0424* (2013.01)

(58) Field of Classification Search
CPC ............................. B62D 3/126; B62D 5/0424
See application file for complete search history.

(56) References Cited

U.S. PATENT DOCUMENTS

| 2015/0284019 A1* | 10/2015 | Yamamoto ............ F16K 15/148 |
| | | 180/443 |
| 2016/0090117 A1* | 3/2016 | Murakami ............... B62D 5/02 |
| | | 180/444 |
| 2017/0341680 A1* | 11/2017 | Yano ..................... B62D 5/0421 |

FOREIGN PATENT DOCUMENTS

| CN | 105644616 A * | 6/2016 | ............. B62D 3/126 |
| EP | 3225509 A1 * | 10/2017 | ........... B62D 5/0403 |
| JP | 2017-214048 A | 12/2017 | |
| WO | 2015/139858 A1 | 9/2015 | |
| WO | WO-2019224899 A1 * | 11/2019 | ............. B62D 3/126 |

OTHER PUBLICATIONS

May 18, 2021 extended Search Report issued in European Patent Application No. 20217032.0.

* cited by examiner

*Primary Examiner* — Jacob D Knutson
(74) *Attorney, Agent, or Firm* — Oliff PLC

(57) ABSTRACT

A steering device includes: a rack shaft; a rack housing; a pinion shaft that meshes with the rack shaft; a speed reducer having a worm wheel that is coupled to the pinion shaft and a worm shaft that meshes with the worm wheel; a speed reducer housing; a motor that drives the worm shaft; a plate-shaped cover that seals an opening of the speed reducer housing; and a breather valve that is mounted on the cover in a state of penetrating through the cover. An inner surface of the cover that faces the worm wheel has an entry restricting part that restricts entry of a lubricant into the breather valve.

6 Claims, 6 Drawing Sheets

STEERING DEVICE

CROSS-REFERENCE TO RELATED APPLICATION

This application claims priority to Japanese Patent Application No. 2019-234609 filed on Dec. 25, 2019, incorporated herein by reference in its entirety.

BACKGROUND

1. Technical Field

The disclosure relates to a steering device that steers a vehicle or the like by turning the turning wheels based on a motor output.

2. Description of Related Art

For example, an electric power steering device employs a structure in which a motor output is applied to a steering shaft or a rack shaft through a speed reducer as an assisting torque. Meanwhile, a technology called steer-by-wire (SBW) has recently been attracting attention. The steer-by-wire technology involves, without mechanically connecting a steering wheel operated by a driver and turning wheels to each other, outputting an operation state of the steering wheel as a signal and, based on this signal, turning the turning wheels by a motor through a speed reducer.

A rack shaft used in these steering devices is covered with a rack housing to shield it from water, mud, etc. When a negative pressure builds up inside the rack housing, water, mud, etc. flow into the rack housing. To prevent this, a breather valve is sometimes mounted on the rack housing or a part communicating with the rack housing.

Japanese Patent Application Publication No. 2017-214048 describes a steering device in which a breather valve is mounted on a speed reducer housing that communicates with a rack housing.

SUMMARY

The inventor conceived an idea of mounting a breather valve to a cover that seals a speed reducer housing to thereby reduce the sizes of members disposed in an engine compartment and cut down on the number of components. It turned out, however, that the breather valve malfunctions depending on the position of the speed reducer housing relative to the rack housing. A result of in-depth experiments and studies conducted by the inventor revealed that the breather valve becomes clogged with a lubricant.

The disclosure provides a steering device that can reduce the likelihood of malfunction of a breather valve.

A steering device according to an aspect of the disclosure increases a rotary torque of a motor by a speed reducer and uses the rotary torque to turn a turning wheel. This steering device includes: a rack shaft that is coupled to the turning wheel; a rack housing that houses the rack shaft; a pinion shaft that meshes with the rack shaft; the speed reducer having a worm wheel that is coupled to the pinion shaft and a worm shaft that meshes with the worm wheel; a speed reducer housing that houses the worm wheel; the motor that drives the worm shaft; a plate-shaped cover that seals an opening of the speed reducer housing; and a breather valve that is mounted on the cover in a state of penetrating through the cover. An inner surface of the cover that faces the worm wheel has an entry restricting part that restricts entry of a lubricant into the breather valve.

The steering device having this aspect can prevent the lubricant from flowing into the breather valve mounted on the cover of the speed reducer housing and thereby enhance the durability of the speed reducer housing.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
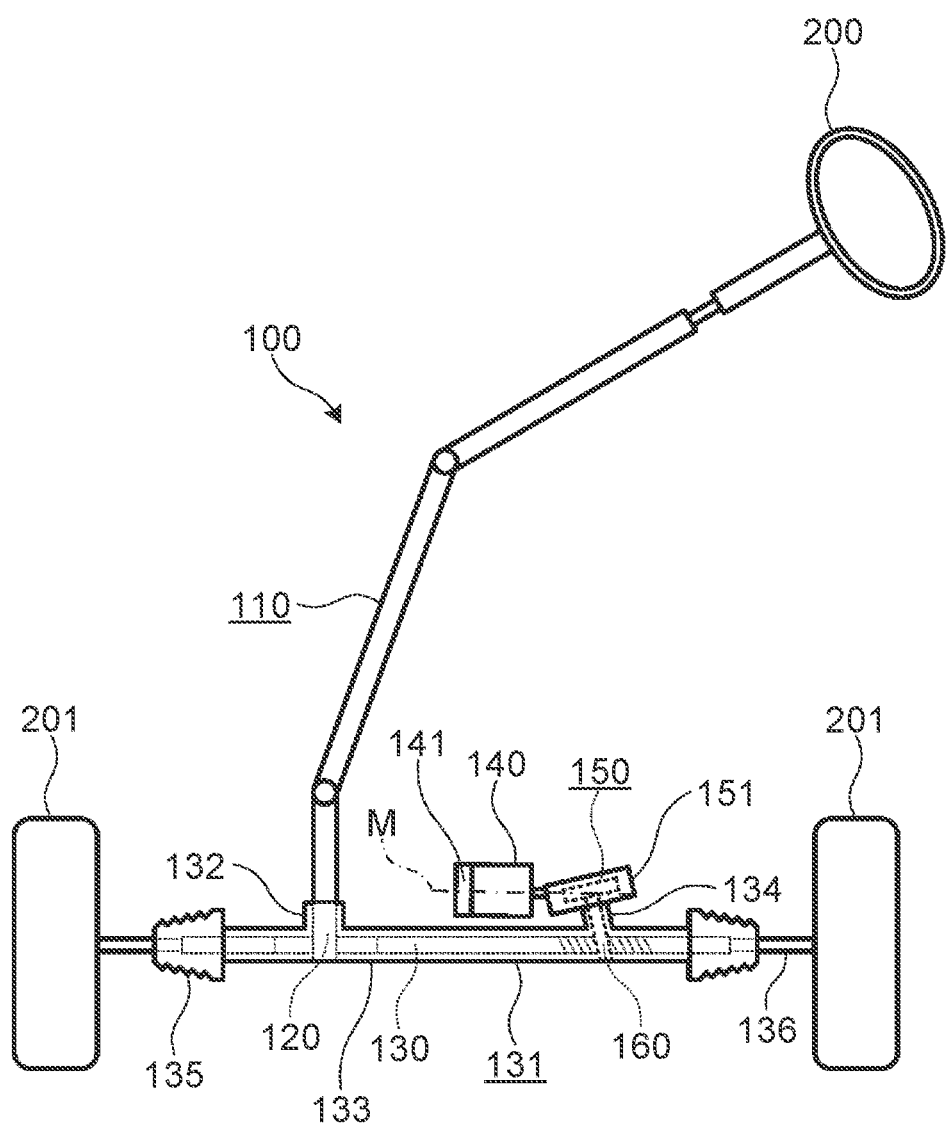
FIG. 1 is a view showing a steering device according to an embodiment.

Next, embodiments of a steering device according to the disclosure will be described with reference to the drawings. Each of the embodiments described below represents a comprehensive or specific example. The numerical values, shapes, materials, constituent elements, layout positions and forms of connection of constituent elements, etc. shown in the following embodiments are merely examples and not intended to limit the disclosure. Those of the constituent elements in the following embodiments that are not described in the independent claim showing the primary concept of the disclosure will be described as optional constituent elements.

The drawings are schematic illustrations in which some parts are emphasized or omitted, or proportions are adjusted as necessary to show the disclosure, and the shapes, positional relationships, and proportions in the drawings may be different from the actual ones.

Figure 2:
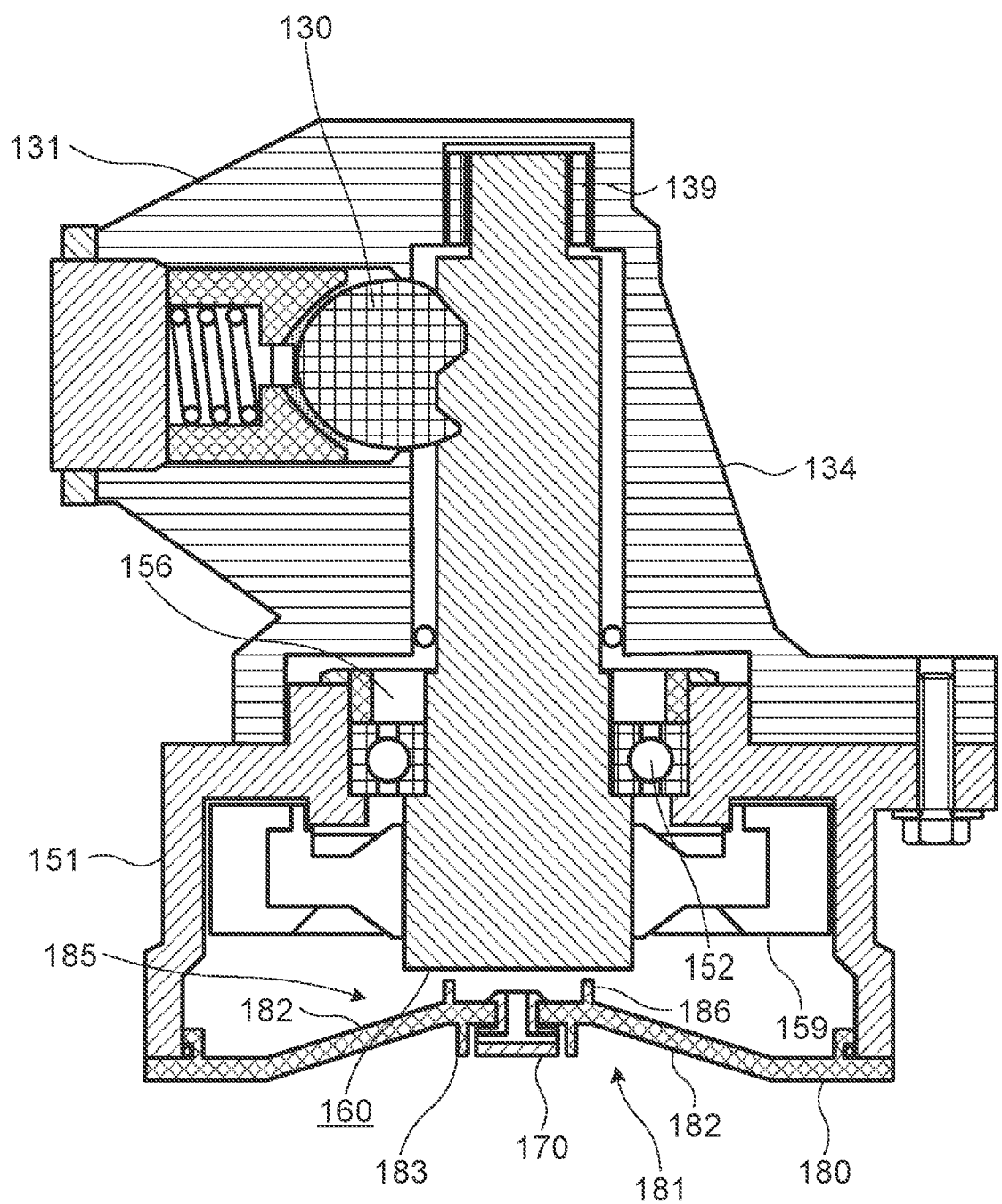
FIG. 2 is a sectional view showing a relationship between a speed reducer housing and a rack housing according to the embodiment.

FIG. 1 is a view showing an entire steering device. FIG. 2 is a sectional view showing a relationship between a speed reducer housing and a rack housing. As shown in these drawings, a steering device 100 is a device that steers a vehicle or the like by increasing a rotary torque that is an output of a motor 140 by a speed reducer 150 and using this rotary torque to turn turning wheels 201 that are so-called tires. In the case of this embodiment, the steering device 100 is a device that includes a steering member 200 to be steered by a driver and can mechanically turn the turning wheels 201 through a steering shaft 110 and a rack shaft 130. The steering device 100 can apply a force for assisting turning of the turning wheels 201 according to a steering torque that is generated as the driver rotates the steering member 200. The steering device 100 includes: the steering shaft 110 composed of a plurality of shaft bodies that is coupled to one another by universal joints; a first pinion shaft 120 that is connected to a leading end of the steering shaft 110; the rack shaft 130 that meshes with the first pinion shaft 120; a rack housing 131 that houses the rack shaft 130; the motor 140; the speed reducer 150 that increases a rotary torque of the motor 140; a speed reducer housing 151 that houses the speed reducer 150; a second pinion shaft 160 that functions as an output shaft of the speed reducer 150; a breather valve 170; and a cover 180.

The rack shaft 130 is a rod-shaped member that is elongated in an axial direction and has a substantially circular cross-section, and is housed in the rack housing 131. The rack shaft 130 is coupled at both ends to the turning wheels 201 through tie rods 136. The rack shaft 130 meshes with the first pinion shaft 120 that rotates as the steering member 200 rotates, and reciprocates relatively to the rack housing 131. As the rack shaft 130 reciprocates in the axial direction, the turning wheels 201 are turned and the vehicle is thereby steered.

The rack housing 131 is a member that is fixed to the vehicle and guides the rack shaft 130 housed inside the rack housing 131 in the axial direction. The rack housing 131 includes: a cylindrical first pinion insertion part 132 (see FIG. 1) into which the first pinion shaft 120 that intersects and comes into contact with the rack shaft 130 is inserted; a cylindrical rack shaft housing part 133 that houses the rack shaft 130 and holds the rack shaft 130 so as to be able to reciprocate in the axial direction; and a cylindrical second pinion insertion part 134 into which the second pinion shaft 160 that meshes with the rack in a state of intersecting the rack shaft 130 is inserted. The rack housing 131 is made of, for example, aluminum alloy. A bellows tube-shaped boot 135 made of rubber or the like is mounted at each end of the rack housing 131. Open ends of the rack housing 131 on both sides in a longitudinal direction are sealed by the boots 135, and openings of the first pinion insertion part 132 and the second pinion insertion part 134 are also sealed, so that the rack housing 131 is to some extent in a hermetic state and water, mud, etc. are prevented from entering the rack housing 131.

The motor 140 is an electric driving source for generating an assisting torque. A motor control unit (MCU) 141 that is an electronic control unit (ECU) for a motor is mounted on the motor 140. The motor 140 outputs an appropriate torque for assisting based on the MCU 141 that has acquired information on a torque applied by the steering member 200 and a vehicle speed. In the case of this embodiment, a rotating shaft M of the motor 140 is disposed parallel or substantially parallel to an extension direction of the rack shaft 130. Thus, it is possible to reduce the amount of protrusion of the motor 140 from the rack housing 131 in a direction perpendicular to the extension direction of the rack shaft 130, and to thereby reduce the size of the steering device 100 inside the engine compartment.

The MCU 141 communicates with the speed reducer housing 151, and the pressure in the MCU 141 is adjusted by the breather valve 170 that is mounted on the speed reducer housing 151.

The speed reducer 150 is a device that reduces the rotation speed of the output shaft of the motor 140 and outputs a torque in inverse proportion to speed reduction to the second pinion shaft 160. In the case of this embodiment, a worm speed reducer composed of a worm shaft (not shown) that is connected to the output shaft of the motor 140 and a worm wheel 159 (see FIG. 2) that is an output gear meshing with the worm shaft is used as the speed reducer 150. The worm wheel 159 is rotatably coupled to the second pinion shaft 160.

The speed reducer housing 151 is a casing that houses the worm shaft and the worm wheel 159 while rotatably supporting the worm shaft and the worm wheel 159. The speed reducer housing 151 is provided with a through-hole 156 into which the second pinion shaft 160 is inserted. The through-hole 156 and the second pinion insertion part 134 of the rack housing 131 communicate with each other, and the second pinion shaft 160 is passed through the through-hole 156 and the second pinion insertion part 134. In the case of this embodiment, a gap between the second pinion shaft 160 and the speed reducer housing 151 or the rack housing 131 is sealed in such a manner that the second pinion shaft 160 can rotate. The speed reducer housing 151 is a member having a shape of two cylinders with different diameters disposed on the same axis, and one end of the speed reducer housing 151 on an outer side of a large-diameter part in which the worm wheel 159 is housed has a circular opening. A bearing 152 mounted in the through-hole 156 of the speed reducer housing 151 rotatably supports the second pinion shaft 160 and the worm wheel 159, while no bearing is provided on the opposite side of the worm wheel 159 from the bearing 152. The material composing the speed reducer housing 151 is not particularly limited. In the case of this embodiment, an alloy consisting mainly of aluminum is used to reduce the weight of the steering device 100.

Figure 3:
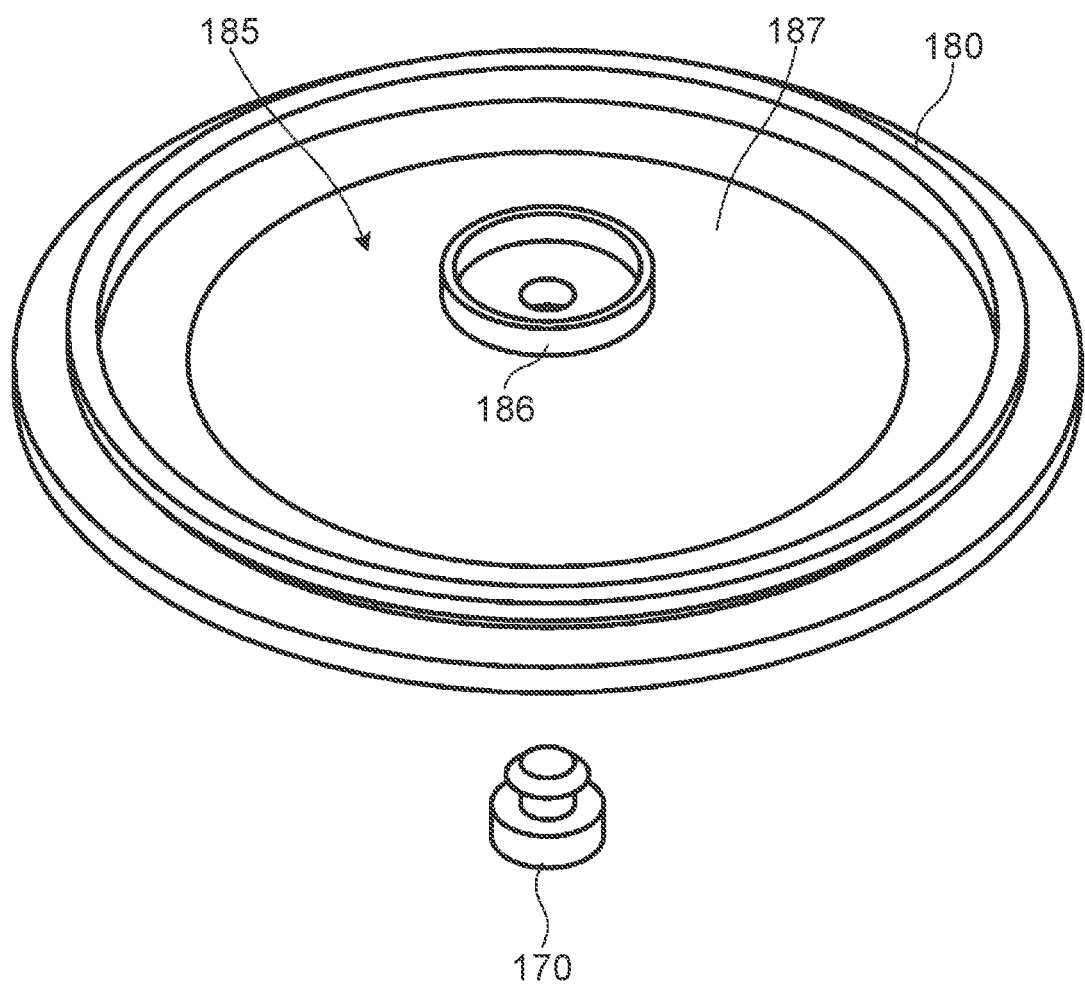
FIG. 3 is a perspective view showing a cover and a breather valve according to the embodiment in an exploded state as seen from an inner side of a speed reducer.
Figure 4:
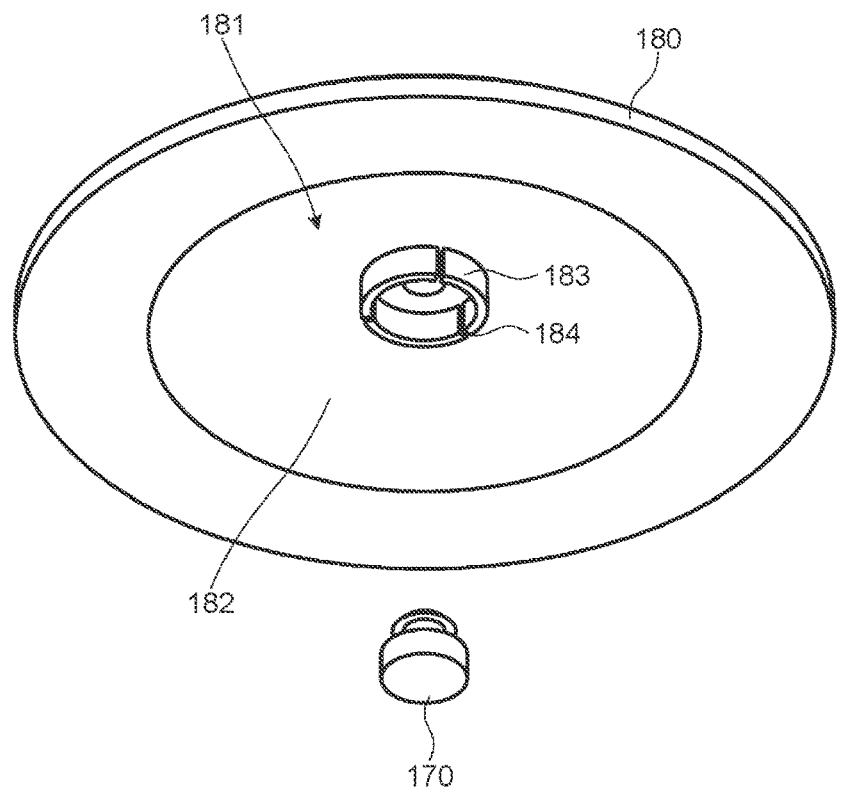
FIG. 4 is a perspective view showing the cover and the breather valve according to the embodiment in an exploded state as seen from an outer side of the speed reducer.

FIG. 3 is a perspective view showing the cover and the breather valve in an exploded state as seen from an inner side of the speed reducer housing. FIG. 4 is a perspective view showing the cover and the breather valve in an exploded state as seen from an outer side of the speed reducer housing. As shown in these drawings, the cover 180 is a plate-shaped member that seals the opening located at one end of the large-diameter part of the speed reducer housing 151, and an inner surface of the cover 180 that faces the worm wheel 159 has an entry restricting part 185 that restricts entry of a lubricant into the breather valve 170 mounted on the cover 180. In the case of this embodiment, the opening of the speed reducer housing 151 has a circular shape, and therefore the cover 180 has a circular plate shape and covers the opening of the speed reducer housing 151 from the outside. The lubricant refers to a member, such as oil, that adheres to the inside of the speed reducer housing 151 to lubricate the worm wheel 159 and the worm shaft that meshes with the worm wheel 159. When the cover 180 is disposed under the worm wheel 159, the lubricant may fall from the worm wheel 159 etc. and adhere to an inner surface of the cover 180 and then move along the cover 180.

Figure 5:
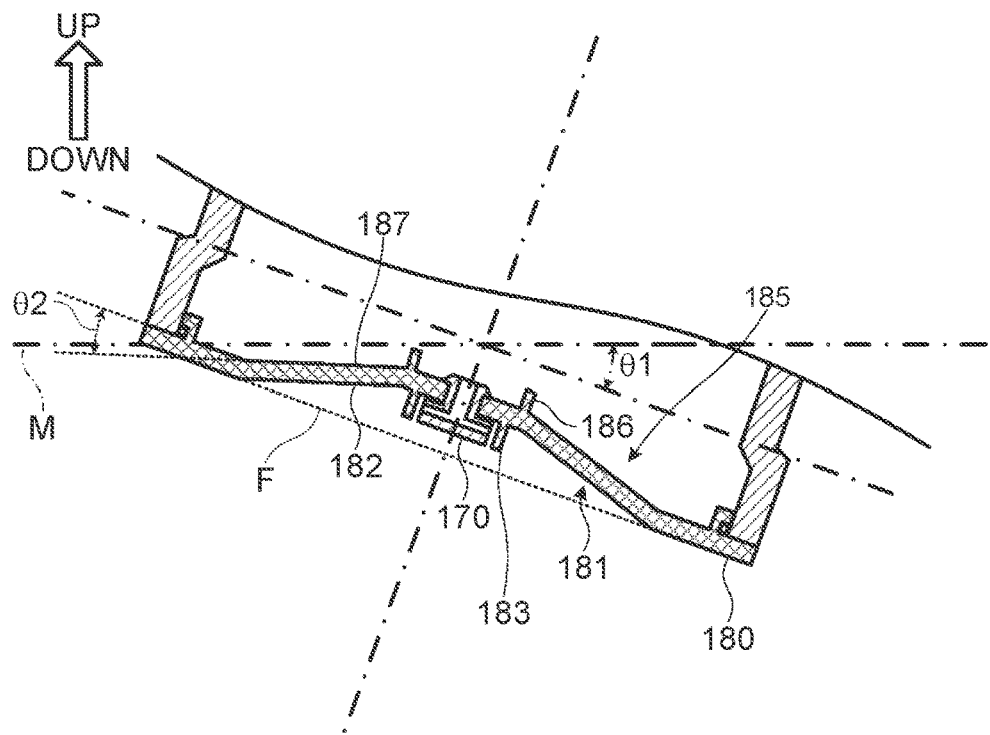
FIG. 5 is a sectional view showing one example of the state of the cover mounted on the speed reducer housing according to the embodiment.

FIG. 5 is a sectional view showing one example of the state of the cover mounted on the speed reducer housing. The shape of the entry restricting part 185 is not particularly limited as long as it can restrict entry of the lubricant into the breather valve 170. In the case of this embodiment, the entry restricting part 185 has a truncated conical shape with a first tapered surface 187 of which the diameter increases gradually toward an outer side from the breather valve 170 that is mounted at a central portion of the entry restricting part 185. The entry restricting part 185 is shaped so as to bulge toward the worm wheel 159 and the breather valve 170 is disposed at the top of the bulge, so that the lubricant adhering to a back side of the cover 180 is less likely to adhere to the breather valve 170. In particular, in a case where the speed reducer housing 151 is disposed under the rack housing 131, if an angle θ2 (see FIG. 5) of the first tapered surface 187 relative to an outer surface of the cover 180 is set to be smaller than an angle θ1 of the outer surface of the cover 180 relative to the rotating shaft M of the motor 140, an opening of the breather valve 170 is located at a higher level than the entry restricting part 185. Thus, the lubricant adhering to the entry restricting part 185 can be guided to a lower side of the cover 180 without reaching the breather valve 170, and thus the lubricant is less likely to adhere to the breather valve 170. Further, the entry restricting part 185 has, at least at a part of a region surrounding the breather valve 170 (in the case of this embodiment, along the entire circumference of the breather valve 170), a wall 186 that is a wall protruding toward the worm wheel 159 (the upper side in FIG. 5) to ward off a flow of the lubricant. Thus, the lubricant is further prevented from entering the breather valve 170.

Figure 6:
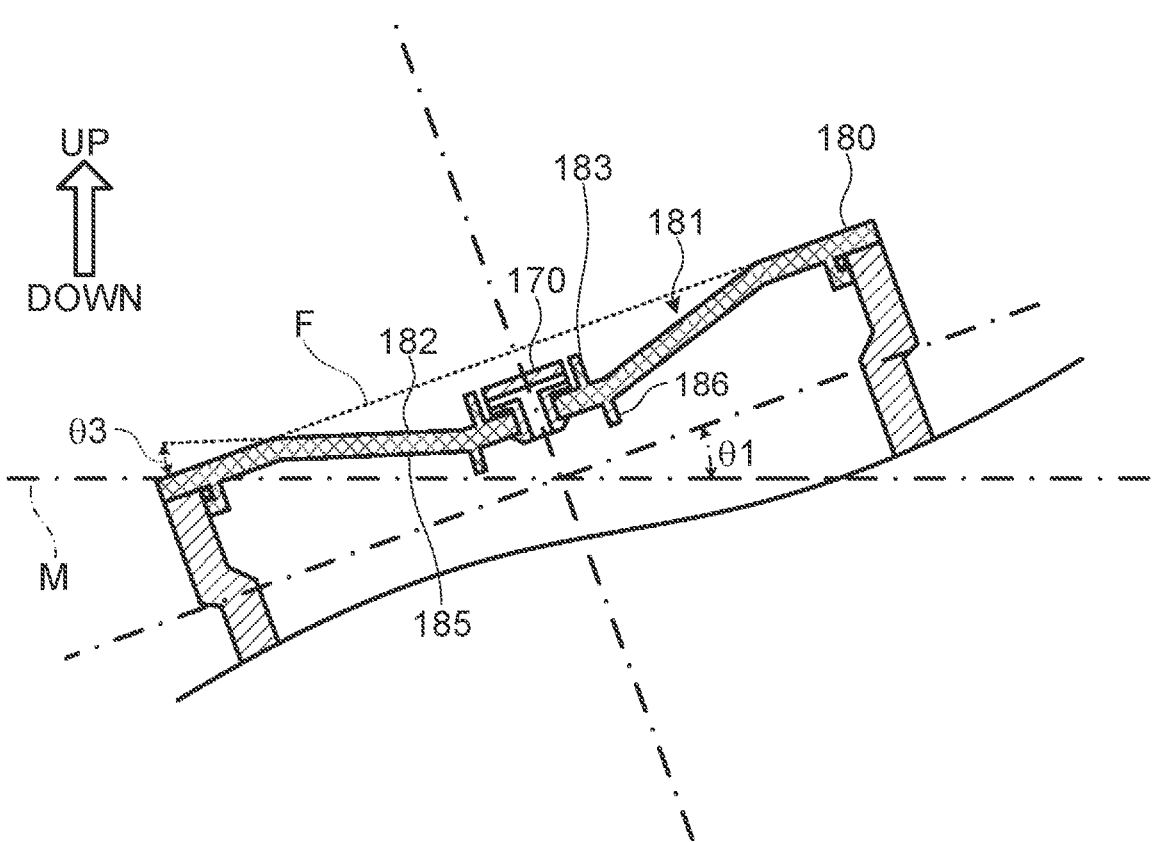
FIG. 6 is a sectional view showing another example of the state of the cover mounted on the speed reducer housing according to the embodiment.

A mount part 181 is a part that is depressed such that the breather valve 170 is located closer to the second pinion shaft 160 than the outer surface of the cover 180 is, i.e., a plane indicated by the broken line F in FIG. 5 and FIG. 6 that is present on an outermost side in the cover 180 is. The shape of the mount part 181 is not particularly limited. In the case of this embodiment, the shape of the mount part 181 conforms to the shape of the entry restricting part 185. The mount part 181 has an inverted truncated conical shape with a second tapered surface 182 of which the diameter increases gradually toward the outer surface from a part on which the breather valve 170 is mounted, which is the bottom of the mount part 181. An angle θ3 (see FIG. 6) of the second tapered surface 182 relative to the outer surface of the cover 180 is set to be smaller than the angle θ1 of the outer surface of the cover 180 relative to the rotating shaft M of the motor 140. Thus, when the cover 180 is disposed above the rack housing 131, water, mud, etc. on the mount part 181 can be relatively easily discharged to the outside of the mount part 181, and accumulation of water around the breather valve 170 can be prevented. While the relationship between the angles is set to be θ2=θ3 in this embodiment, it is not particularly limited and may instead be θ2<θ3.

A protection wall 183 is a ring-shaped part that is erected from the bottom of the mount part 181 toward the outer side, at a position a predetermined distance away from the breather valve 170, so as to surround the breather valve 170. While the height of protrusion of the protection wall 183 is not particularly limited, the height of protrusion is preferably equal to or above the height position of the breather valve 170 in a state of being mounted on the cover 180, and is set such that the protection wall 183 does not extend beyond the outer surface of the cover 180. The protection wall 183 does not have a closed ring shape but is divided into a plurality of parts in a circumferential direction by slits 184 (see FIG. 4). The protection wall 183 prevents foreign matter from adhering to the breather valve 170 disposed inside the protection wall 183 and degrading the function of the breather valve 170. The slits 184 provided in the protection wall 183 prevent water, mud, etc. from accumulating in a part surrounded by the protection wall 183.

While the material composing the cover 180 is not particularly limited, resin is used in the case of this embodiment. Using resin as the material of the cover 180 can reduce the weight of the speed reducer 150 as a whole, and makes it easy to integrally manufacture the entry restricting part 185 and the mount part 181 on one side and the other side of the cover 180. It is also made easy to integrally manufacture the wall 186, the protection wall 183, the slits 184, etc.

The breather valve 170 is a member that is mounted at the bottom of the mount part 181 of the cover 180 in the state of penetrating through the cover 180, and that adjusts the internal pressures of the speed reducer housing 151, the motor 140 communicating with the speed reducer housing 151, and the MCU 141 to be equal to the atmospheric pressure, as well as prevents water, mud, etc. from entering inside these parts. The structure of the breather valve 170 is not particularly limited. For example, a labyrinth structure may be adopted to prevent entry of water, mud, etc. while securing circulation of air. In the case of this embodiment, the breather valve 170 includes a membrane-like member that has air permeability and yet can restrict entry of water, mud, etc. from the outside. Gore (R) membrane can be named as a specific example of the membrane-like member.

The second pinion shaft 160 is a shaft body that is coupled to the worm wheel 159 of the speed reducer 150 so as to rotate integrally with the worm wheel 159, and outputs a rotary torque of the motor 140 having been amplified by the speed reducer 150. The second pinion shaft 160 is rotatably mounted on the speed reducer housing 151 through the bearing 152. In the case of this embodiment, the second pinion shaft 160 meshes with the rack shaft 130 and applies a force to the rack shaft 130. A leading end of the second pinion shaft 160 located on the side of the rack housing 131 is rotatably mounted on the rack housing 131 through a second bearing 139.

In the steering device 100 according to this embodiment, the motor 140 and the MCU 141 communicate with the breather valve 170 through the speed reducer housing 151, and the internal pressures of the motor 140 and the MCU 141 are adjusted to be equal to the atmospheric pressure even when they repeatedly undergo thermal expansion due to temperature changes or the like. Moreover, entry of water, mud, etc. into the motor 140 and the MCU 141 is restricted.

In the case where the speed reducer housing 151 is disposed under the rack housing 131, even when the lubricant that allows smooth movement of the speed reducer 150 adheres to the inner surface of the cover 180, entry of the lubricant into the breather valve 170 is restricted by the entry restricting part 185, so that the function of the breather valve 170 can be maintained for a long time.

Since the breather valve 170 is mounted on the cover 180, it is not necessary to provide the rack housing 131, the speed reducer housing 151, etc. with a complicated structural part for mounting the breather valve 170. Therefore, the production efficiency of the rack housing 131 and the speed reducer housing 151 can be increased.

Since the breather valve 170 is mounted at the bottom of the depressed mount part 181 so as not to protrude beyond the outer surface of the cover 180 of the speed reducer housing 151, the function of the breather valve 170 can be delivered without the size of the entire speed reducer 150 being affected. Having a small size, the speed reducer 150 can avoid interference with other members inside the engine compartment.

The disclosure is not limited to the above-described embodiment. For example, another embodiment that is realized by arbitrarily combining or omitting some of the constituent elements described in this specification may be regarded as an embodiment of the disclosure. Modified examples that those skilled in the art can establish by making various conceivable modifications to the above-described embodiment within such a range that does not depart from the gist of the disclosure, i.e., the meanings of the words described in the claims, are also included in the scope of the disclosure.

Figure 7:
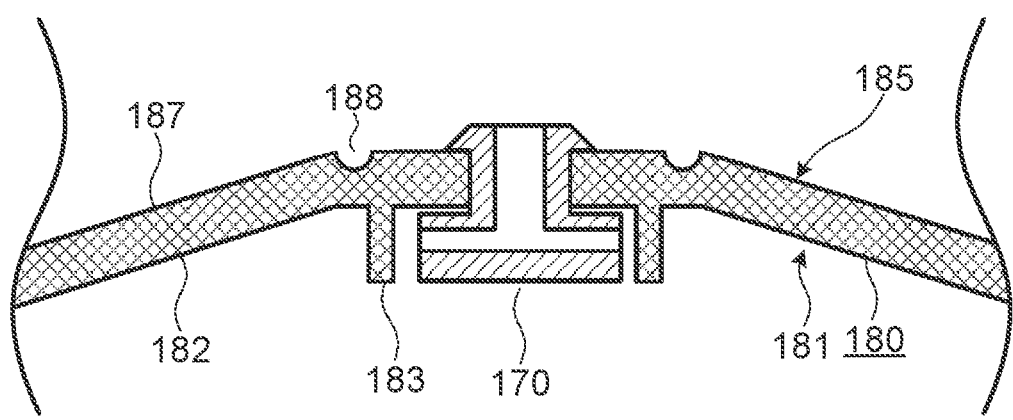
FIG. 7 is a sectional view showing another example of an entry restricting part.

For example, as shown in FIG. 7, the entry restricting part 185 may have, at least at a part of the region surrounding the breather valve 170, a guide groove 188 that is recessed toward the side opposite from the worm wheel 159 (the lower side in FIG. 7) and guides a flow of the lubricant away from the breather valve 170. For example, when a ring-shaped guide groove 188 is provided so as to surround the entire circumference of the breather valve 170, the guide groove 188 functions as a gutter and the lubricant adhering to the back side of the cover 180 is guided by the guide groove 188 and falls so as to circumvent the breather valve 170.

While the example in which the breather valve 170 is disposed on the side of the second pinion shaft 160 at a predetermined distance from the outer surface of the cover 180 has been shown, the breather valve 170 may instead be disposed such that a surface of the breather valve 170 on the outer side and the outer surface of the cover 180 are flush with each other. In this case, the depth of the mount part 181 becomes smaller, and the angle θ2 of the first tapered surface 187 and the angle θ3 of the second tapered surface 182 relative to the outer surface of the cover 180 can be reduced. Thus, on the inner side of the speed reducer housing 151, entry of the lubricant into the breather valve 170 can be easily restricted, while on the outer surface of the cover 180, natural discharge of water, mud, etc. from the mount part 181 can be more easily realized. Moreover, the amount of protrusion of the cover 180 toward the inner side of the speed reducer housing 151 can be reduced and thereby the size of the speed reducer 150 can be reduced.

A hole may be provided at an end of the second pinion shaft 160 at which the second pinion shaft 160 and the breather valve 170 face each other in an axial direction of the second pinion shaft 160, and part of the breather valve 170 may be disposed inside this hole. This can reduce the sizes of the speed reducer 150 and the speed reducer housing 151 in the axial direction of the second pinion shaft 160.

Figure 8:
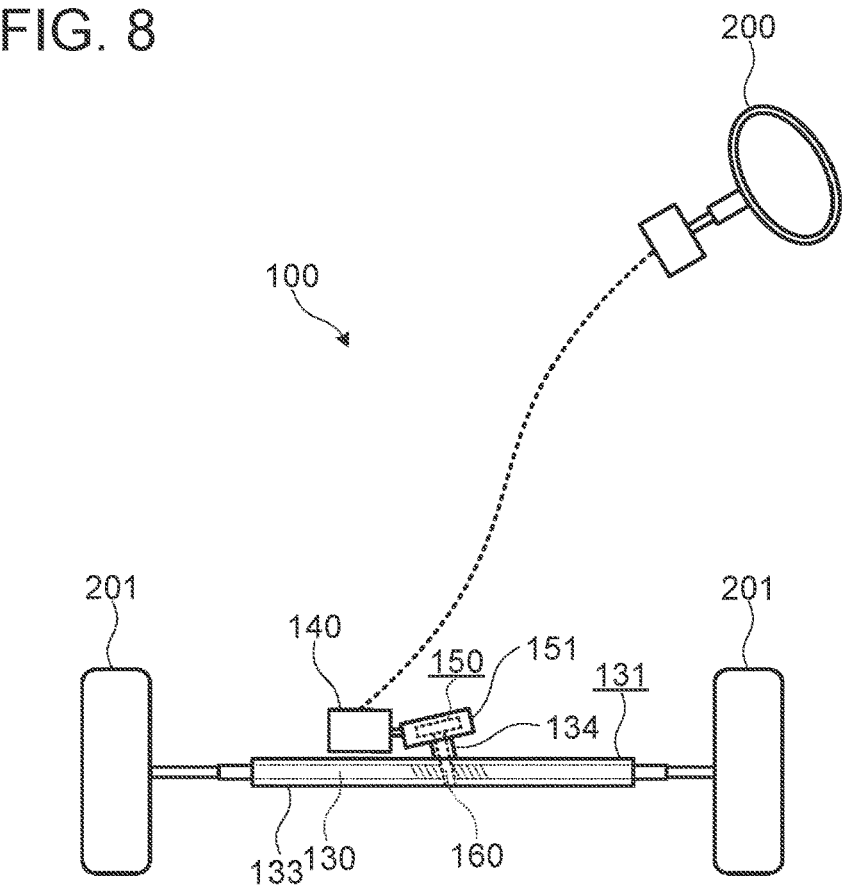
FIG. 8 is a view showing a steering device according to Other Embodiment 1.

As shown in FIG. 8, the steering device 100 may be a so-called steer-by-wire (SBW) system in which the steering member 200 and the rack shaft 130 are not mechanically coupled to each other, and in which a rotation angle of the steering member 200 etc. is detected by a sensor or the like and, based on a signal from the sensor or the like, the rack shaft 130 reciprocates and turns the turning wheels 201 as the second pinion shaft 160 rotates.

Figure 9:
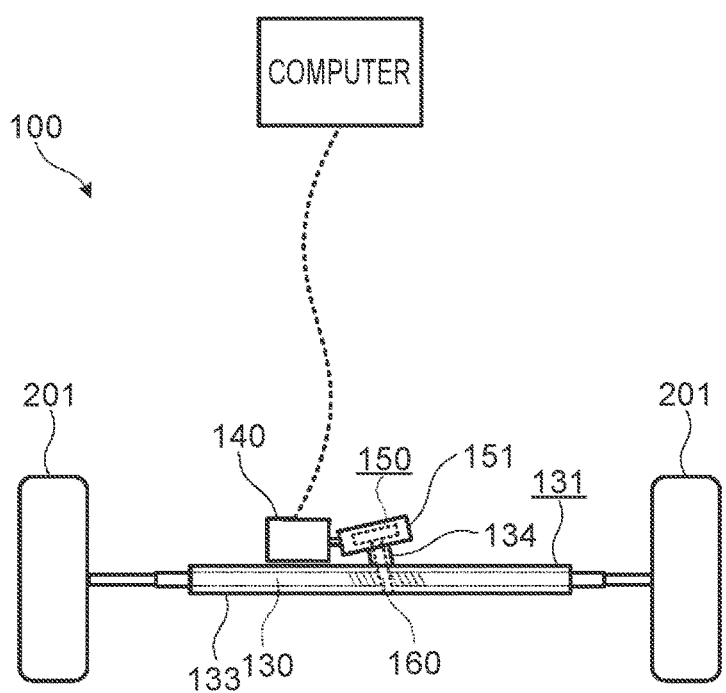
FIG. 9 is a view showing a steering device according to Other Embodiment 2.

Further, as shown in FIG. 9, the steering device 100 may be an unmanned steering device that does not include the steering member 200, the steering shaft 110, etc. and a computer steers a vehicle or the like.

The disclosure is applicable to steering devices of vehicles or the like, such as a steering device that can assist a steering force exerted by a human, an SBW in which a steering member and turning wheels are not mechanically connected to each other and which electrically steers, and an unmanned steering device.

What is claimed is:

1. A steering device that increases a rotary torque of a motor by a speed reducer and uses the rotary torque to turn a turning wheel, the steering device comprising:
   a rack shaft that is coupled to the turning wheel;
   a rack housing that houses the rack shaft;
   a pinion shaft that meshes with the rack shaft;
   the speed reducer having a worm wheel that is coupled to the pinion shaft and a worm shaft that meshes with the worm wheel;
   a speed reducer housing that houses the worm wheel;
   the motor that drives the worm shaft;
   a plate-shaped cover that seals an opening of the speed reducer housing; and
   a breather valve that is mounted on the cover and penetrates through the cover, wherein
   the breather valve faces a center axis of rotation of the worm wheel,
   the cover is disposed under the worm wheel, and
   an inner surface of the cover that faces the worm wheel has an entry restricting part that restricts entry of a lubricant into the breather valve.

2. The steering device according to claim 1, wherein:
   the cover has a mount part which is depressed toward an inner side of the cover and on which the breather valve is mounted; and
   the entry restricting part bulges toward the inner side along the mount part.

3. The steering device according to claim 1, wherein the entry restricting part has, at least at a part of a region surrounding the breather valve, a wall that protrudes toward the worm wheel and wards off a flow of the lubricant.

4. The steering device according to claim 1, wherein the entry restricting part has, at least at a part of a region surrounding the breather valve, a guide groove that is depressed toward a side opposite from the worm wheel and guides a flow of the lubricant.

5. The steering device according to claim 1, wherein the entry restricting part includes a wall that protrudes from the inner surface of the cover toward the worm wheel and encircles the breather valve, the wall being spaced from an inner peripheral surface of the opening of the speed reducer housing to which the cover is sealed.

6. A steering device that increases a rotary torque of a motor by a speed reducer and uses the rotary torque to turn a turning wheel, the steering device comprising:
   a rack shaft that is coupled to the turning wheel;
   a rack housing that houses the rack shaft;
   a pinion shaft that meshes with the rack shaft;
   the speed reducer having a worm wheel that is coupled to the pinion shaft and a worm shaft that meshes with the worm wheel;
   a speed reducer housing that houses the worm wheel;
   the motor that drives the worm shaft;
   a plate-shaped cover that seals an opening of the speed reducer housing; and
   a breather valve that is mounted on the cover and penetrates through the cover, wherein
   an inner surface of the cover that faces the worm wheel has an entry restricting part that restricts entry of a lubricant into the breather valve, and
   the entry restricting part has, at least at a part of a region surrounding the breather valve, a guide groove that is depressed toward a side opposite from the worm wheel and guides a flow of the lubricant.

* * * * *